United States Patent
Cheng et al.

(10) Patent No.: US 11,551,466 B2
(45) Date of Patent: Jan. 10, 2023

(54) CONTROL CIRCUIT AND RELATED METHOD FOR CONTROLLING DISPLAY PANEL

(71) Applicant: NOVATEK Microelectronics Corp., Hsin-Chu (TW)

(72) Inventors: Huan-Teng Cheng, Hsinchu (TW); Wei-Lun Shih, Hsinchu (TW); Huang-Chin Tang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 14 days.

(21) Appl. No.: 16/851,043

(22) Filed: Apr. 16, 2020

(65) Prior Publication Data

US 2021/0056333 A1  Feb. 25, 2021

Related U.S. Application Data

(60) Provisional application No. 62/890,052, filed on Aug. 21, 2019.

(51) Int. Cl.
*G06F 3/00* (2006.01)
*G06V 40/13* (2022.01)
(Continued)

(52) U.S. Cl.
CPC ........ *G06V 40/1318* (2022.01); *G06F 1/3262* (2013.01); *G06F 3/0412* (2013.01);
(Continued)

(58) Field of Classification Search
CPC .............. G06K 9/0004; G06K 9/2027; G06K 9/00355; G06K 9/00912; G06F 3/0488;
(Continued)

(56) References Cited

U.S. PATENT DOCUMENTS 9,720,639 B1    8/2017  Morgan
9,733,740 B2 *  8/2017  Cho ...................... G06F 3/0488
(Continued)

FOREIGN PATENT DOCUMENTS

CN    104798311 A    7/2015
CN    106203026 A    12/2016
(Continued)

OTHER PUBLICATIONS

Cheng, the specification, including the claims, and drawings in the U.S. Appl. No. 16/999,019 , filed Aug. 20, 2020.
(Continued)

*Primary Examiner* — Michael A Faragalla
(74) *Attorney, Agent, or Firm* — Winston Hsu

(57) ABSTRACT

A control circuit configured to control a display panel includes a display driver circuit, a touch sensing circuit and a fingerprint sensing circuit. The touch sensing circuit, coupled to the display driver circuit and the fingerprint sensing circuit, is configured to detect a finger touch on the display panel, determine a position of the display panel on which the finger touch is detected, and send information associated with the position to the fingerprint sensing circuit. The fingerprint sensing circuit is configured to perform fingerprint sensing on at least one zone corresponding to the position and receive fingerprint image signals from the at least one zone correspondingly.

12 Claims, 10 Drawing Sheets

(51) Int. Cl.
  *G06F 3/04817* (2022.01)
  *G09G 5/10* (2006.01)
  *G06F 3/041* (2006.01)
  *G06F 3/0488* (2022.01)
  *G09G 3/34* (2006.01)
  *G06F 1/3234* (2019.01)
  *G06V 10/141* (2022.01)
  *G06V 40/60* (2022.01)

(52) U.S. Cl.
  CPC .......... *G06F 3/0416* (2013.01); *G06F 3/0488* (2013.01); *G06F 3/04186* (2019.05); *G06F 3/04817* (2013.01); *G06V 10/141* (2022.01); *G06V 40/67* (2022.01); *G09G 3/3406* (2013.01); *G09G 5/10* (2013.01); *G06F 2203/04105* (2013.01); *G09G 2354/00* (2013.01)

(58) Field of Classification Search
  CPC .......... G06F 3/041661; G06F 3/04186; G06F 3/0412; G06F 1/3262; G06F 3/04883; G06F 3/04886; G06F 3/0416; G06F 2203/04105; G09G 5/10; G09G 2320/0686; G09G 3/3406; G09G 2354/00; G09G 3/20; G09G 2320/0646
  See application file for complete search history.

(56) References Cited

U.S. PATENT DOCUMENTS

| | | |
|---|---|---|
| 2013/0021289 A1 | 1/2013 | Chen |
| 2014/0101737 A1 | 4/2014 | Rhee |
| 2015/0109237 A1 | 4/2015 | Liang |
| 2015/0135108 A1 | 5/2015 | Pope |
| 2015/0286268 A1 | 10/2015 | Komatsu |
| 2016/0110056 A1 | 4/2016 | Hong |
| 2016/0202779 A1 | 7/2016 | Jiang |
| 2016/0253540 A1 | 9/2016 | Han |
| 2016/0371691 A1 | 12/2016 | Kang |
| 2017/0124372 A1 | 5/2017 | Evans |
| 2017/0200037 A1 | 7/2017 | Hong |
| 2017/0206395 A1 | 7/2017 | Chang |
| 2017/0344148 A1 | 11/2017 | Han |
| 2017/0351850 A1 | 12/2017 | Jin |
| 2018/0035923 A1 | 2/2018 | Kang |
| 2018/0101715 A1 | 4/2018 | Lee |
| 2018/0164943 A1 | 6/2018 | Hung |
| 2018/0218195 A1 | 8/2018 | Sheik-Nainar |
| 2018/0224999 A1 | 8/2018 | Lee |
| 2018/0260600 A1 | 9/2018 | Kremin |
| 2018/0329560 A1 | 11/2018 | Kim |
| 2018/0348949 A1 | 12/2018 | Kim |
| 2018/0349669 A1 | 12/2018 | Kim |
| 2018/0373361 A1 | 12/2018 | Her |
| 2019/0019048 A1 | 1/2019 | Deng |
| 2019/0065808 A1* | 2/2019 | Zhang .................. G06K 9/0004 |
| 2019/0354226 A1* | 11/2019 | Choi .................... H04L 63/0861 |
| 2020/0092411 A1 | 3/2020 | Xu |
| 2020/0167537 A1* | 5/2020 | Lee ...................... G06K 9/0002 |

FOREIGN PATENT DOCUMENTS

| | | |
|---|---|---|
| CN | 104850292 B | 9/2017 |
| CN | 107402663 A | 11/2017 |
| CN | 109409070 A | 3/2019 |
| CN | 109885998 A | 6/2019 |
| CN | 110070006 A | 7/2019 |
| EP | 3 401 772 A1 | 11/2018 |
| TW | 201145107 A1 | 12/2011 |
| TW | M509927 U | 10/2015 |
| TW | 201604705 A | 2/2016 |
| TW | 201604792 A | 2/2016 |
| TW | I559233 B | 11/2016 |
| TW | 201704969 A | 2/2017 |
| TW | 201709106 A | 3/2017 |
| TW | I598789 B | 9/2017 |
| TW | I610194 B | 1/2018 |
| TW | I630523 B | 7/2018 |
| TW | 201839650 A | 11/2018 |
| TW | 201839659 A | 11/2018 |
| TW | 201842467 A | 12/2018 |
| TW | I662452 B | 6/2019 |

OTHER PUBLICATIONS

Cheng, the specification, including the claims, and drawings in the U.S. Appl. No. 16/865,404 , filed May 3, 2020.

* cited by examiner

CONTROL CIRCUIT AND RELATED METHOD FOR CONTROLLING DISPLAY PANEL

CROSS REFERENCE TO RELATED APPLICATIONS

This application claims the benefit of U.S. Provisional Application No. 62/890,052, filed on Aug. 21, 2019, the contents of which are incorporated herein by reference.

BACKGROUND OF THE INVENTION

1. Field of the Invention

The present invention relates to a control circuit and a related method for controlling a display panel, and more particularly, to a control circuit capable of controlling a display panel to wake up from the off-screen mode based on fingerprint sensing.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user only needs to put his/her finger on a fingerprint sensing pad or area to login the electronic device instead of entering long and tedious username and password.

Conventionally, if a user needs to wake up an electronic device (e.g., a mobile phone) from an off-screen mode, the user may apply double-click or any similar touch gestures on the screen to realize the operation. If the screen is locked and thus requires fingerprint recognition to unlock itself, the unlocking operation may be more complex with combination of the fingerprint recognition function and touch sensing operation. For example, the fingerprint control circuit should communicate with the system processor for determination and comparison of the fingerprint's features, and the user should move his/her finger to a designated position on the display panel, allowing the fingerprint sensing signals to be read out. The redundant operations and time consumption decrease the sensing speed and thus reduce the user experience of fingerprint recognition.

In general, the display panel may have a screen disposed with touch sensor and fingerprint sensor, to be capable of receiving touch signals and fingerprint signals. A control circuit may be applied to control the display driving, touch sensing, and fingerprint sensing functions on the display panel. FIG. 1 illustrates a common operation of unlocking a screen based on fingerprint recognition. In general, when the display panel is in a sleep mode or standby mode, the display function may be disabled to save power consumption. If a finger touch on the screen is detected, the touch sensing circuit of the control circuit may inform a system processor of the information of finger touch. In response, the system processor enables the screen to display and sends image data to control the screen to show an icon indicating a designated position to receive the fingerprint image. Subsequently, the user may move the finger to the designated position, and the fingerprint sensing circuit of the control circuit may receive the fingerprint image signals and forward the corresponding image data to the system processor. Therefore, the system processor may compare the features of the received fingerprint image with previously stored fingerprint data to determine whether they are matching, in order to determine whether to unlock the screen.

In the unlocking operation with fingerprint recognition, the fingerprint image signals and related display data should be sent back and forth between the control circuit and the system processor, and thus larger time consumption is necessary for the communications. Also, since the user has to move his/her finger to the designated position indicated by the system, the additional action and time reduce the user experience of fingerprint recognition. Further, since the system processor is required to send an image signal to the screen to show the icon, more power consumption is necessary to realize the display function. Thus, there is a need for improvement over the prior art.

SUMMARY OF THE INVENTION

It is therefore an objective of the present invention to provide a control circuit and a related method for controlling a display panel, in order to solve the abovementioned problems.

An embodiment of the present invention discloses a control circuit configured to control a display panel. The control circuit comprises a display driver circuit, a touch sensing circuit and a fingerprint sensing circuit. The touch sensing circuit, coupled to the display driver circuit and the fingerprint sensing circuit, is configured to detect a finger touch on the display panel, determine a position of the display panel on which the finger touch is detected, and send information associated with the position to the fingerprint sensing circuit. The fingerprint sensing circuit is configured to perform fingerprint sensing on at least one zone corresponding to the position and receive fingerprint image signals from the at least one zone correspondingly.

Another embodiment of the present invention discloses a method of a control circuit for controlling a display panel. The method comprises the steps of: detecting a finger touch on the display panel; determining a position of the display panel on which the finger touch is detected; sending, by a touch sensing circuit of the control circuit, information associated with the position of the display panel on which the finger touch is detected to a fingerprint sensing circuit and a display driver circuit of the control circuit; and performing, by the fingerprint sensing circuit, fingerprint sensing on at least one zone corresponding to the position and receiving fingerprint image signals from the at least one zone correspondingly.

These and other objectives of the present invention will no doubt become obvious to those of ordinary skill in the art after reading the following detailed description of the preferred embodiment that is illustrated in the various figures and drawings.

DETAILED DESCRIPTION

In order to improve the convenience of fingerprint recognition, the control circuit and related display panel of the present invention are capable of the in-display fingerprint sensing function; that is, the fingerprint signals may be sensed at any position of the screen. To achieve this purpose, there may be a sensor array disposed in the display panel. The sensor array may be implemented as one or more sensing pixels, each having a photodiode for sensing the light to generate a sensing signal and a transistor for forwarding the sensing signal to the control circuit. In such a situation, an optical fingerprint unlocking operation may be realized by using the photodiode(s) in the touch region to sense the light reflected from the touch finger.

In general, the control circuit applied to deal with the touch sensing operation and fingerprint sensing operation of a display device having touch and fingerprint sensing functions may be a fingerprint, touch and display integration (FTDI) circuit. In an embodiment, the FTDI circuit may be implemented as an integrated circuit integrated in a single chip. Alternatively, the FTDI circuit may be a combination of multiple chips having control circuits with different functions. To facilitate the illustration, the control circuit will generally be called "FTDI circuit" hereinafter.

Figure 1:
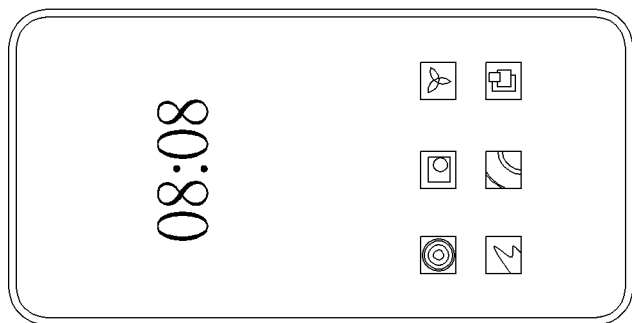
FIG. 1 illustrates a common operation of unlocking a screen based on fingerprint recognition.
Figure 1:
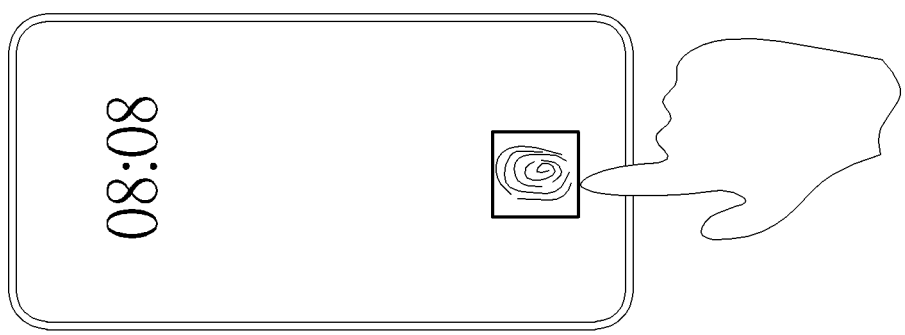
Figure 1:
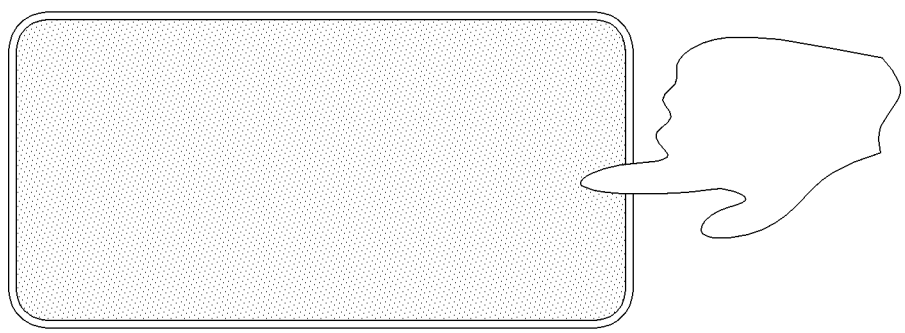
Figure 2:
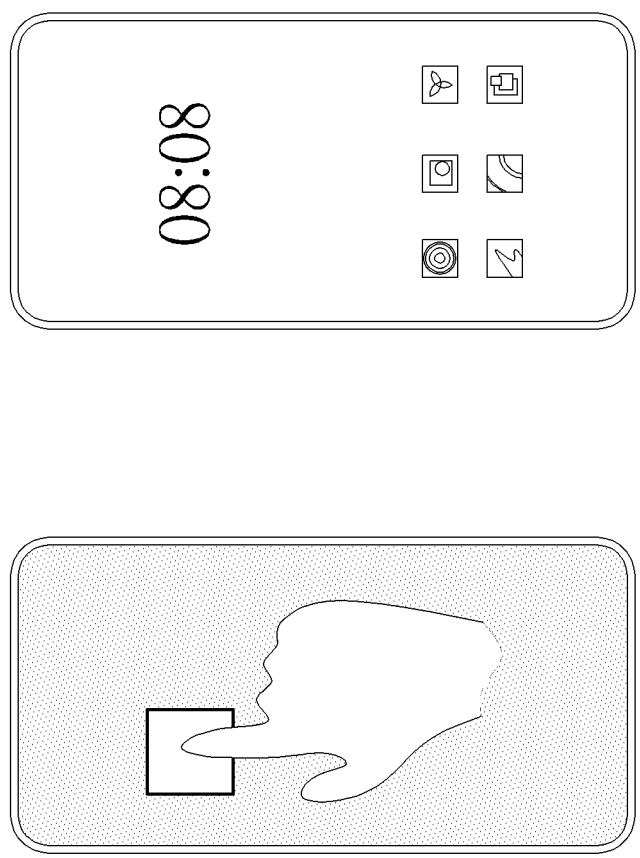
FIG. 2 is a schematic diagram of a method of unlocking a screen based on fingerprint recognition according to an embodiment of the present invention.

Please refer to FIG. 2, which is a schematic diagram of a method of unlocking a screen based on fingerprint recognition according to an embodiment of the present invention. As shown in FIG. 2, in order to unlock the screen, the user may touch any position of the screen with a finger. As mentioned above, the optical fingerprint unlocking scheme requires that the panel emits light at the touch region so as to sense the reflected light from the finger. Therefore, if the finger touch is detected, the touch sensing circuit of the FTDI circuit may wake up the display driver circuit of the FTDI circuit, in order to show a specific image on the screen. Without control of the system processor, the display driver circuit may light on the screen to show the image by using an internal clock display scheme. The internal clock display means that the display data may be outputted to the panel from the FTDI circuit based on control and synchronization of an internal clock of the FTDI circuit. In such a situation, no additional clock from the system processor is required, and the image may be shown without the control of the system processor. This reduces the back and forth communication between the FTDI circuit and the system processor, so as to reduce the required time consumption for fingerprint recognition. In an embodiment, the display driver circuit may control the panel to show an exposure icon at the finger touch position. Meanwhile, no exposure is required in other areas on the panel (i.e., the areas except for the finger touch position), and thus the black image may be shown in order to save power consumption, as shown in FIG. 2.

After the finger touch is detected, the fingerprint sensing circuit may start to perform fingerprint sensing on the touch region and receive the fingerprint image signals. The related image data are then forwarded to the system processor, and the system processor may perform matching and determine whether the received fingerprint image have a predetermined feature in the database. The screen may be unlocked and show the wallpaper if the fingerprint matching is successful. For example, the system processor may include a security module such as a trust zone, where the fingerprint matching may be performed to determine whether to unlock the screen. In the trust zone, the information of fingerprint features of the registered fingerprint may be recorded. An algorithm is applied to determine whether the received fingerprint image matches with the recorded fingerprint features, so as to determine whether to unlock the screen.

According to the embodiments of the present invention, in order to unlock the screen, the user only needs to put his/her finger on an arbitrary position of the screen, and the fingerprint sensing operation may be performed on the touch position. This achieves the blind unlocking from the off-screen mode, and also simplifies the fingerprint sensing flow to increase the sensing speed, so as to improve the user experience of fingerprint recognition.

Figure 3:
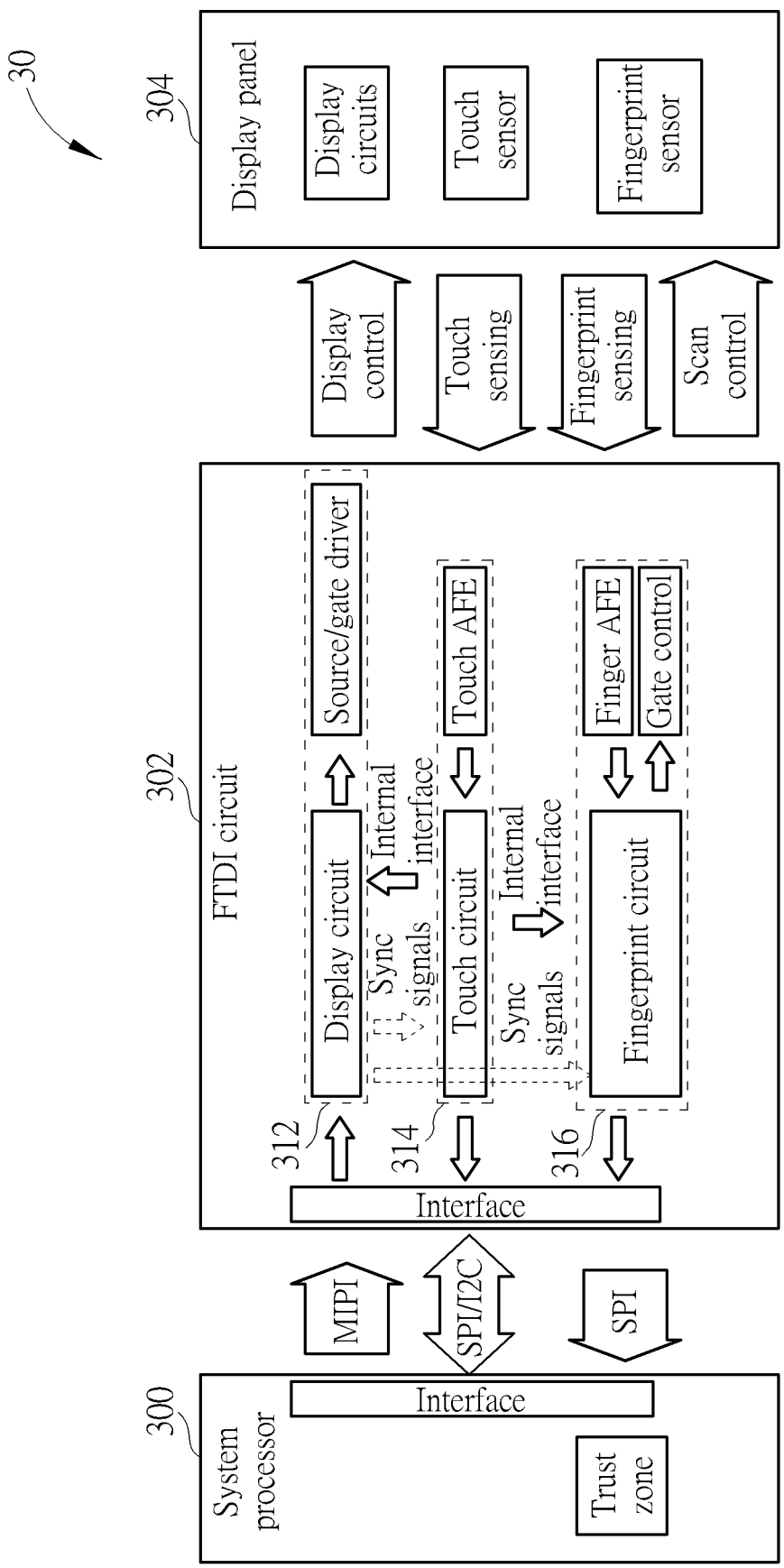
FIG. 3 is a schematic diagram of a fingerprint sensing system according to an embodiment of the present invention.

Please refer to FIG. 3, which is a schematic diagram of a fingerprint sensing system 30 according to an embodiment of the present invention. As shown in FIG. 3, the fingerprint sensing system 30 includes a system processor 300, an FTDI circuit 302, and a display panel 304. The system processor 300 may be a core processor of the electronic system, such as a central processing unit (CPU), a microcontroller unit (MCU), a microprocessor, and the like. As for a smart phone, the system processor 300 may be an MCU for controlling various applications and operations. The system processor 300 may include a security module such as a trust zone, where an algorithm is configured to perform fingerprint matching. Note that the algorithm for fingerprint recognition is usually quite complex, such that the fingerprint matching operation should be performed in the system processor 300 having larger computation resources and may not be implemented in the FTDI circuit 302. The FTDI circuit 302 aims at capturing or extracting the fingerprint image from the display panel 304, and processing the received fingerprint signals to amplify and acquire the desired image data.

The FTDI circuit 302 may be served as a control circuit for controlling the operations of the display panel 304. In an embodiment, the display panel 304 may be an in-cell touch and fingerprint panel, where the touch sensor and fingerprint sensor and their related wire connection circuits are disposed inside the display panel 304, e.g., disposed on the substrate of the display panel 304.

In order to realize the fingerprint unlocking operation, the FTDI circuit 302 includes a display driver circuit 312, a touch sensing circuit 314 and a fingerprint sensing circuit 316. The display driver circuit 312 is configured to control the display panel 304 to emit light and show the corresponding exposure icon. The touch sensing circuit 314 is configured to detect a finger touch on the display panel 304 and determine the position of the display panel 304 where the finger touch is detected. The fingerprint sensing circuit 316 is configured to perform fingerprint sensing on any position(s) of the display panel 304 and receive the fingerprint image signals correspondingly.

In detail, the display driver circuit 312 may communicate with the system processor 300 through a mobile industry processor interface (MIPI). During the normal display process, the display driver circuit 312 may receive image data from the system processor 300, and output the voltage signals of image data to the display panel 304. The display driver circuit 312 may include source and gate drivers for outputting the voltage signals and related control signals to the display circuits of the display panel 304, in order to realize the display control. The display driver circuit 312 is also capable of the internal clock display function, where the display driver circuit 312 may generate the image signals without control of the system processor 300, and the image signals may be sent to the display panel 304 based on control and synchronization of the internal clock of the FTDI circuit 302.

The touch sensing circuit 314 may realize the touch sensing functions, to detect the finger touch on the display panel 304. The touch sensing circuit 314 may include a touch MCU for controlling the touch sensing operations. The touch MCU may communicate with the system processor 300 through a serial peripheral interface (SPI) or an inter-integrated circuit (I2C) interface. The touch sensing circuit 314 may also include a touch analog front-end (AFE) circuit, which is configured to output touch driving signals to the display panel 304 and correspondingly receive touch sensing signals from the touch sensor of the display panel 304. In an embodiment, the touch sensing circuit 314 may determine that a finger touch appears on a specific position or zone of the display panel 304, and thereby notify the display driver circuit 312 to show the exposure icon at the position or zone and notify the fingerprint sensing circuit 316 to perform fingerprint sensing on the position or zone. Upon receiving the notifications from the touch sensing circuit 314, the display driver circuit 312 may control the display panel 304 to show the exposure icon, to indicate the position of the touch finger.

The fingerprint sensing circuit 316 is configured to perform the fingerprint sensing functions, to scan the fingerprint sensor and receive the fingerprint image signals from the display panel 304. In detail, the fingerprint sensing circuit 316 may include a gate control circuit for transmitting control signals to the fingerprint sensor to perform scanning, and include a fingerprint AFE circuit for receiving the fingerprint image signals correspondingly. The fingerprint sensing circuit 316 may also include a fingerprint readout circuit, which is capable of amplifying the peak and valley information in the received fingerprint image signals and filtering out unwanted noises and interferences. The fingerprint readout circuit may communicate with the system processor 300 through an SPI. In such a situation, the peak and valley information in the fingerprint image may be sent to the system processor 300, allowing the system processor 300 to perform fingerprint matching and recognition in a security module, e.g., the trust zone. In an embodiment, the fingerprint sensing circuit 316 is capable of selectively scanning specific zone(s) of the display panel 304 to receive the fingerprint image signals, where the zone (s) may correspond to the position where finger touch is detected.

Please keep referring to FIG. 3. In the FTDI circuit 302, the touch sensing circuit 314 may be coupled to the display driver circuit 312 and the fingerprint sensing circuit 316, and communication is perform therebetween. In general, in order to control the display panel 304 with in-cell touch and fingerprint sensors, the display control, touch control and fingerprint control should be performed based on time division. In such a situation, the display driver circuit 312 may send a synchronization signal or an internal clock to the touch sensing circuit 314 and the fingerprint sensing circuit 316, to synchronize the display control, touch sensing and fingerprint sensing operations. An internal interface is also disposed between the touch sensing circuit 314 and each of the display driver circuit 312 and the fingerprint sensing circuit 316, allowing the touch sensing circuit 314 to send the information of finger touch position to the display driver circuit 312 and the fingerprint sensing circuit 316, to realize the in-display fingerprint sensing. For example, the touch sensing circuit 314 may perform touch sensing to calculate the coordinate point of the touch position. The touch sensing circuit 314 then informs the display driver circuit 312 and the fingerprint sensing circuit 316 of the coordinate information; hence, the display driver circuit 312 may control the display panel 304 to show the exposure icon at the coordinate point, and the fingerprint sensing circuit 316 may scan the zone (s) corresponding to the coordinate point to receive the fingerprint image.

Figure 4:
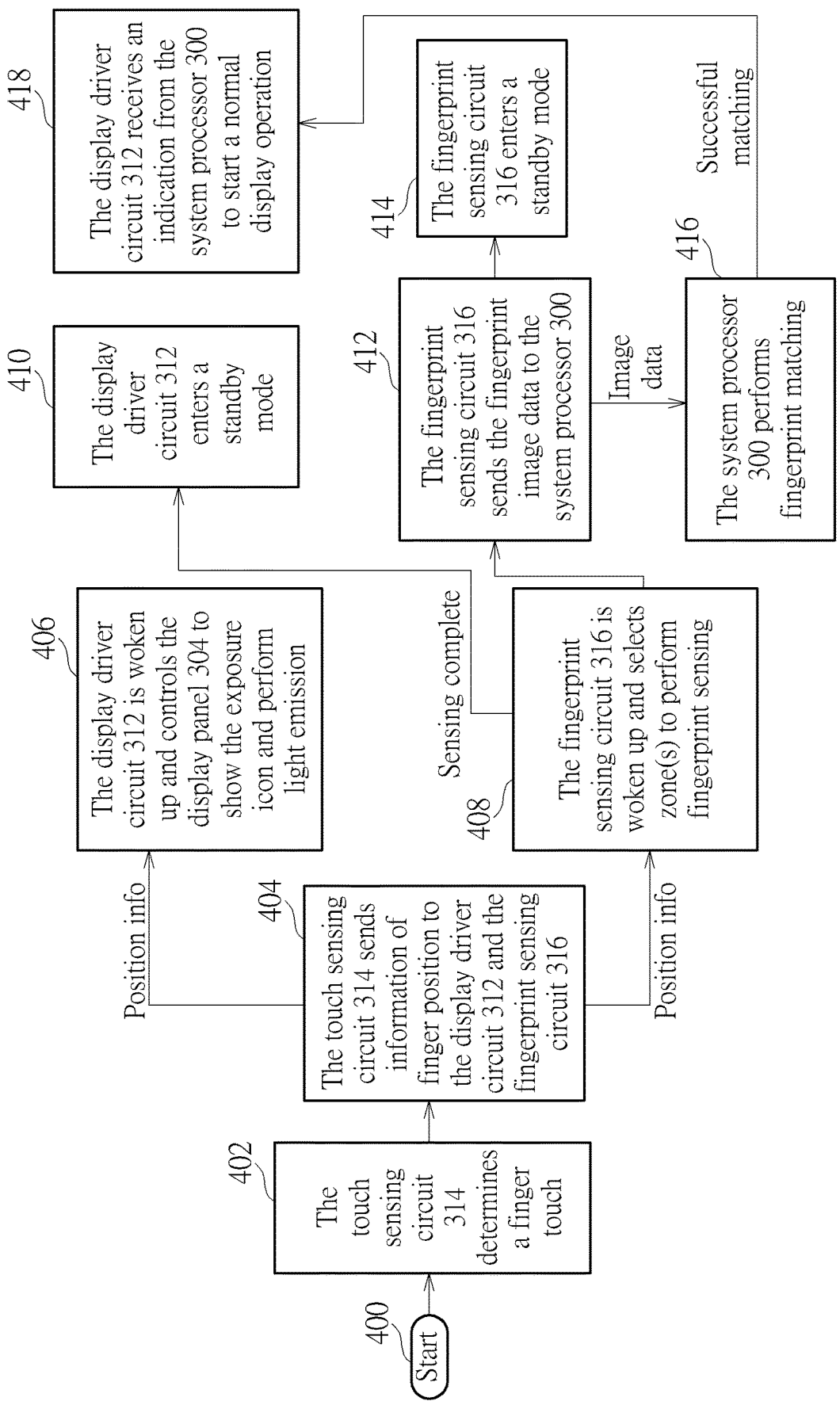
FIG. 4 is a flowchart of a screen unlocking process according to an embodiment of the present invention.

Please refer to FIG. 4, which is a flowchart of a screen unlocking process 40 according to an embodiment of the present invention. The screen unlocking process 40, which may be implemented in a control circuit for a panel such as the FTDI circuit 302 shown in FIG. 3, includes the following steps:

Step 400: Start.

Step 402: The touch sensing circuit 314 determines a finger touch.

Step 404: The touch sensing circuit 314 sends information of finger position to the display driver circuit 312 and the fingerprint sensing circuit 316.

Step 406: The display driver circuit 312 is woken up and controls the display panel 304 to show the exposure icon and perform light emission.

Step 408: The fingerprint sensing circuit 316 is woken up and selects zone(s) to perform fingerprint sensing.

Step 410: The display driver circuit 312 enters a standby mode after the fingerprint sensing is complete.

Step 412: The fingerprint sensing circuit 316 sends the fingerprint image data to the system processor 300.

Step 414: The fingerprint sensing circuit 316 enters a standby mode after the fingerprint sensing is complete and the fingerprint image data is sent.

Step 416: The system processor 300 performs fingerprint matching.

Step 418: The display driver circuit 312 receives an indication from the system processor 300 to start a normal display operation if the system processor 300 determines that the fingerprint matching is successful.

In the beginning of the screen unlocking process 40, the display panel 304 is in the off-screen mode, and the display driver circuit 312 and the fingerprint sensing circuit 316 are in the sleep mode or standby mode. At this moment, the detection may be performed by the touch sensing circuit 314 only. In an embodiment, under the off-screen mode, low power wakeup gesture detection may be performed, in order to save power consumption. For example, the touch sensing circuit 314 may be periodically woken up to output a scan pulse to detect the existence of touch finger, while other modules and circuits in the FTDI circuit 302 are in the sleep mode.

More specifically, the touch sensing circuit 314 may perform 1-dimensional (1D) scan to detect whether there is a finger putting on the screen. The 1D scan refers to scan for detecting a touch event without obtaining the detailed information such as coordinate point of the finger. The periodic 1D scan may achieve lower power consumption since it simply detects the existence of finger touch without making any efforts to calculate the detailed information of the finger touch. After a finger touch is detected, the touch sensing circuit 314 may start to perform 2-dimensional (2D) scan to obtain the touch coordinate point of the finger. In detail, under the capacitive touch sensing scheme, the capacitance value of several sensing electrodes closer to the touch area may be acquired to calculate the extent of touch area and the coordinate point of the touch finger. If the extent of touch area is greater than a predetermined threshold, the touch event may be determined to be a valid finger touch, and thus the display driver circuit 312 and the fingerprint sensing circuit 316 may be woken up from the sleep mode to perform the follow-up steps.

Subsequently, the touch sensing circuit 314 may send the information associated with the position of touch finger to the display driver circuit 312 and the fingerprint sensing circuit 316. Please refer to FIG. 5, which is a schematic diagram of information associated with the position of touch finger for the display driver circuit 312 and the fingerprint sensing circuit 316. As mentioned above, in order to realize the optical fingerprint unlocking scheme, the display panel 304 should be lighted on at the touch region to perform light exposure. Therefore, the touch sensing circuit 314 may send the information of touch position to the display driver circuit 312, allowing the display driver circuit 312 to control the display panel 304 to emit light and correspondingly show the exposure icon at the position where the finger touch is detected. At this moment, the display driver circuit 312 may start the internal clock display, where the display operation is controlled by using the internal clock of the FTDI circuit 302 without additional control of the system processor 300. Meanwhile, the display driver circuit 312 may send the synchronization signal to the touch sensing circuit 314 and the fingerprint sensing circuit 316 to synchronize the display control, touch sensing and fingerprint sensing operations of the FTDI circuit 302.

Figure 6:
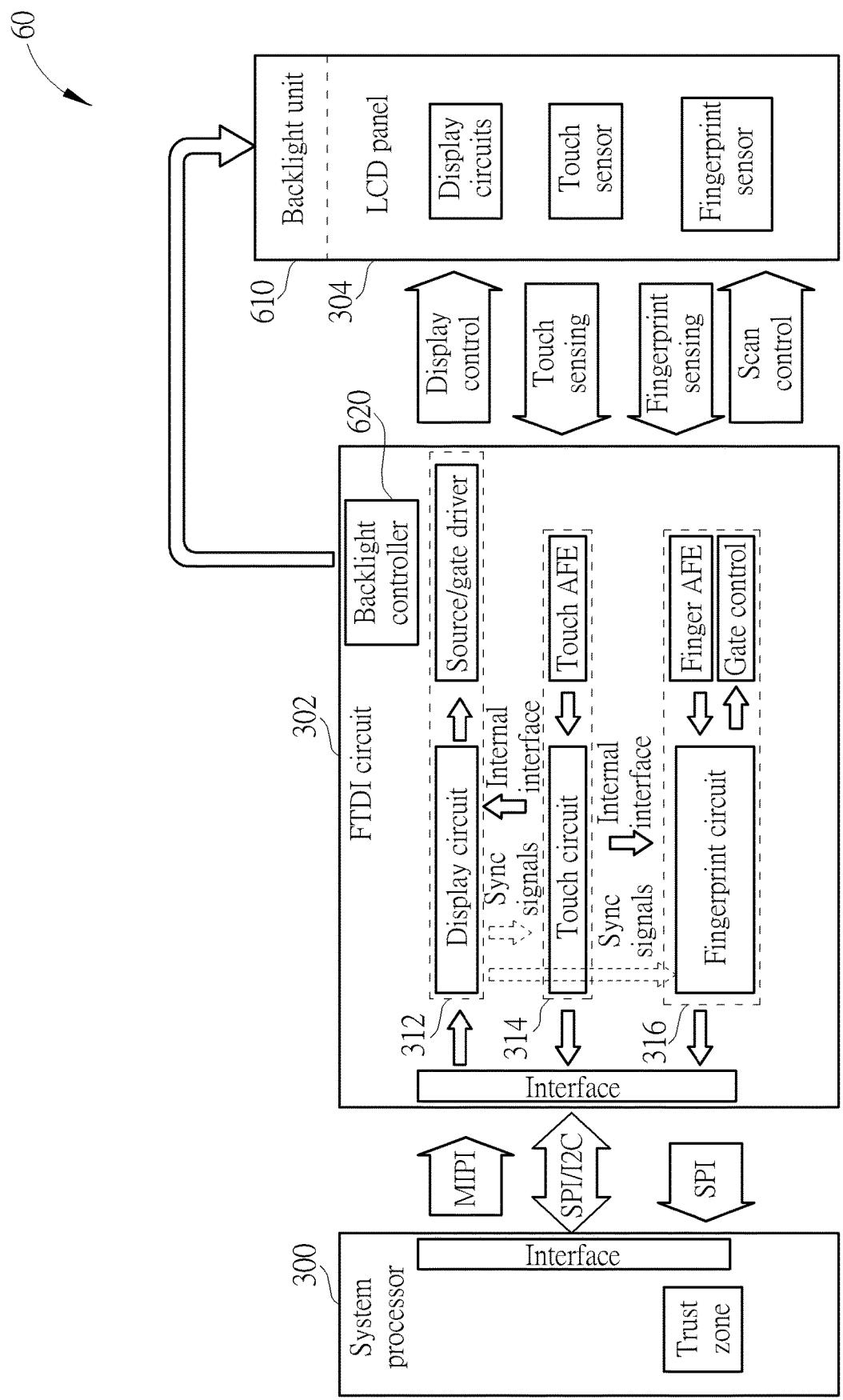
FIG. 6 is a schematic diagram of a fingerprint sensing system with backlight control according to an embodiment of the present invention.

In an embodiment, if the FTDI circuit 302 is configured to control a liquid crystal display (LCD) panel, a backlight controller may be included to perform backlight control. Please refer to FIG. 6, which is a schematic diagram of a fingerprint sensing system 60 with backlight control. As shown in FIG. 6, the display panel 304 may be an LCD panel having a backlight unit 610, where the display operation is performed by turning on the backlight unit 610. Also, the display driver circuit 312 may further include a backlight controller 620, which is configured to control the backlight unit 610 to emit light and also control the emitted light intensity. Note that in a conventional LCD panel, the display operations are controlled by the system processor, and thus the related backlight unit is also controlled by the system processor. In comparison, in the fingerprint sensing system 60 of the present invention, the backlight unit 610 may also be controlled by the backlight controller 620 of the FTDI circuit 302, and thus the display operations may be realized without the control of the system processor 300.

Figure 5:
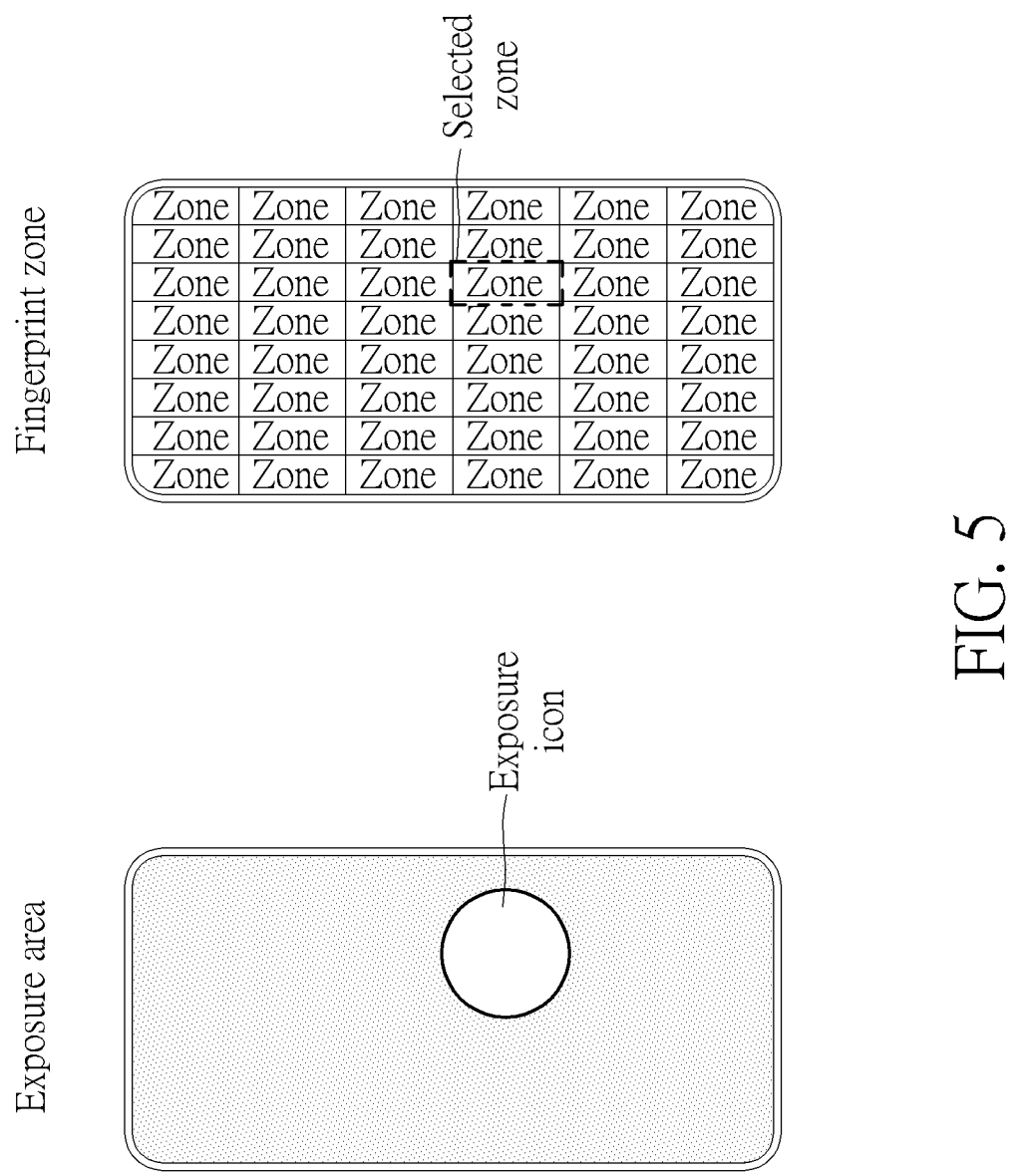
FIG. 5 is a schematic diagram of information associated with the position of the touch finger for the display driver circuit and the fingerprint sensing circuit.

On the other hand, the information associated with touch position should also be sent to the fingerprint sensing circuit 316 to facilitate the fingerprint sensing operations. In general, the fingerprint sensor on the display panel 304 may be separated into several zones, and the fingerprint scan may be performed in one or several zones based on the touch position of the finger, as shown in FIG. 5. In an embodiment, the touch sensing circuit 314 may determine the position and corresponding zone (s) of the display panel 304 on which the finger touch is detected, and send the related information to the fingerprint sensing circuit 316; hence, the fingerprint sensing circuit 316 may perform fingerprint sensing on the zone (s) and receive the fingerprint image signals from the zone (s) correspondingly. In such a situation, the fingerprint sensing may not need to be performed on the entire screen. Instead, the fingerprint sensing is performed only on the zone (s) corresponding to the position on which the finger touch is detected, and the fingerprint image signals are only received from the zone(s) determined or selected based on the finger's position. This reduces the time consumption and computation resources for fingerprint recognition and matching, and thus the fingerprint recognition speed may be improved.

After the fingerprint sensing is complete and the fingerprint image signals are received, the fingerprint sensing circuit 316 may notify the display driver circuit 312 to enter the standby mode, to wait for follow-up instructions. Therefore, the display driver circuit 312 may control the display panel 304 to stop emitting light, e.g., to disable the backlight unit 610, and the screen becomes off. The fingerprint sensing circuit 316 may also send an interrupt signal to the system processor 300 to notify that the system processor 300 may start to perform fingerprint matching, and then output the image data corresponding to the received fingerprint image signals to the system processor 300. For example, an interrupt pin is connected between the system processor 300 and the FTDI circuit 302, and the interrupt signal may be sent via the interrupt pin. Alternatively, the interrupt signal may be included in a packet transmitted through the SPI interface disposed between the system processor 300 and the fingerprint sensing circuit 316.

Upon receiving the image data, the system processor 300 may perform fingerprint matching to determine whether to unlock the display panel 304. In an embodiment, the system processor 300 may include a trust zone configured to perform fingerprint matching. If the matching is successful (e.g., the matching indicates that the received fingerprint image has a specific feature), the system processor 300 may unlock the display panel 304 and control the display panel 304 and the display driver circuit 312 to start the normal display operations. As a result, the system processor 300 may start to deal with the fingerprint recognition functions after the interrupt signal is received. Before the fingerprint sensing operation is complete, the system processor 300 may not be involved in the screen unlocking operation, and thus tedious communications between the system processor and the FTDI circuit in the conventional unlocking method may be omitted.

Figure 7:
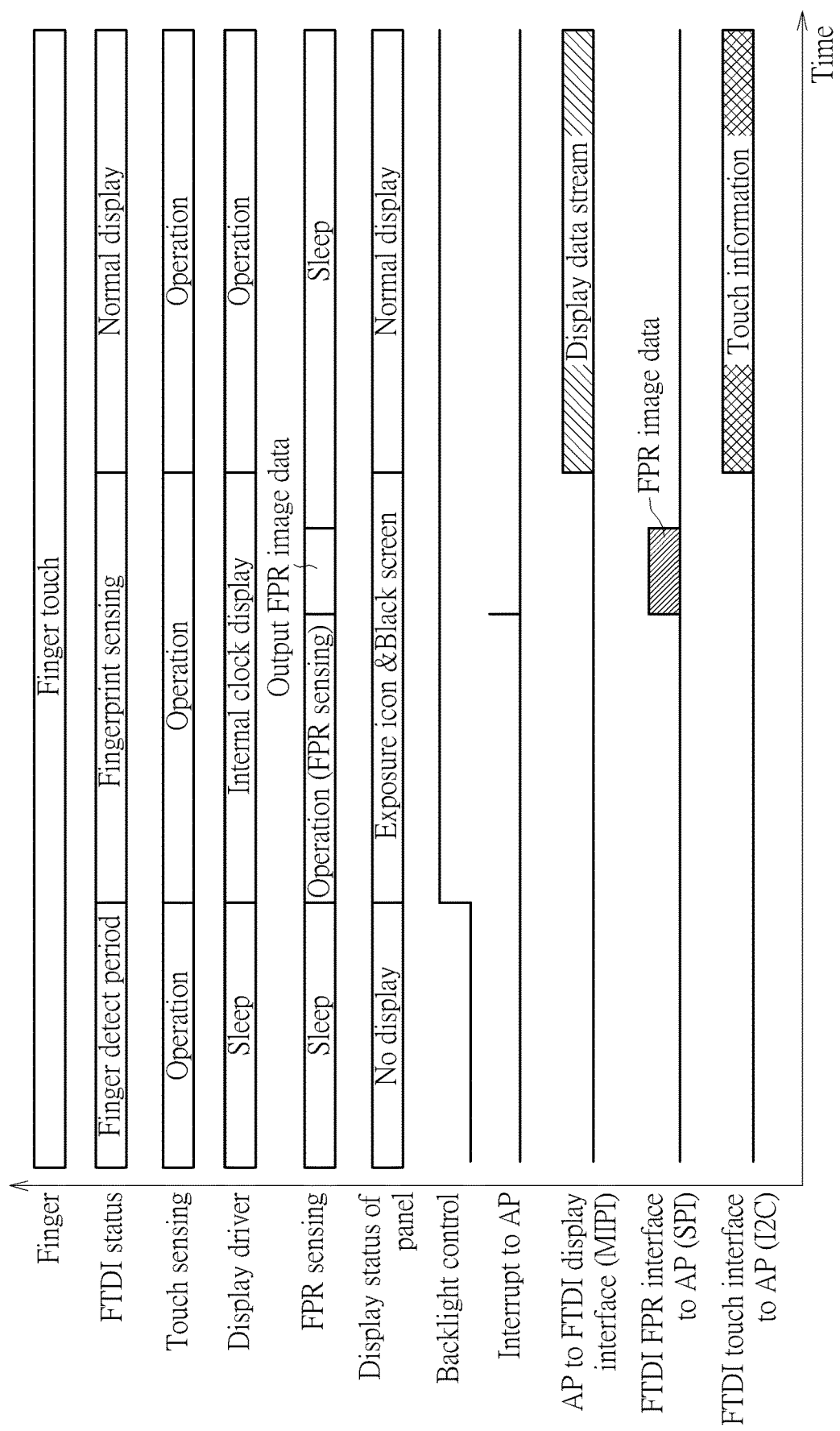
FIGS. 7-9 are timing diagrams of the operations of the fingerprint sensing system.

Please refer to FIG. 7, which is a timing diagram of the operations of the fingerprint sensing system 30 or 60, where the statuses of each circuit module of the FTDI circuit 302 and the interfaces between the FTDI circuit 302 and the system processor 300 are illustrated. As shown in FIG. 7, in the beginning, both the display driver circuit 312 and the fingerprint sensing circuit 316 are in the sleep mode, and the display panel 304 is off-screen under the turned-off backlight. At this moment, only the touch sensing circuit 314 is operated to detect the finger touch. Afterwards, the touch sensing circuit 314 detects a finger touch and wakes up the display driver circuit 312 and the fingerprint sensing circuit 316, and the operations of fingerprint sensing starts. The fingerprint sensing circuit 316 may perform fingerprint (FPR) sensing by itself, i.e., without control of the system processor 300; and the display driver circuit 312 may perform the internal clock display, i.e., without control of the system processor 300, where the backlight unit 610 may be turned on by the display driver circuit 312. At this moment, the display panel 304 may show the exposure icon at the touch position of finger with a black screen at other areas. Note that before the fingerprint sensing operation is complete, no communication between the system processor 300 and the FTDI circuit 302 is required.

When the fingerprint sensing is complete, the fingerprint sensing circuit 316 sends an interrupt signal to the system processor (AP) 300, and then correspondingly sends the fingerprint image data through the fingerprint control interface (e.g., the SPI interface). The system processor 300 may start to perform fingerprint recognition and matching. Subsequently, after the fingerprint matching is successful, the normal display operations may be started, and the touch sensing operations may be performed normally. At this moment, the system processor 300 may continuously send display data stream to the display driver circuit 312 through the display control interface (e.g., the MIPI interface), and the touch sensing circuit 314 may continuously report touch information to the system processor 300 through the touch control interface (e.g., the I2C interface).

Figure 8:
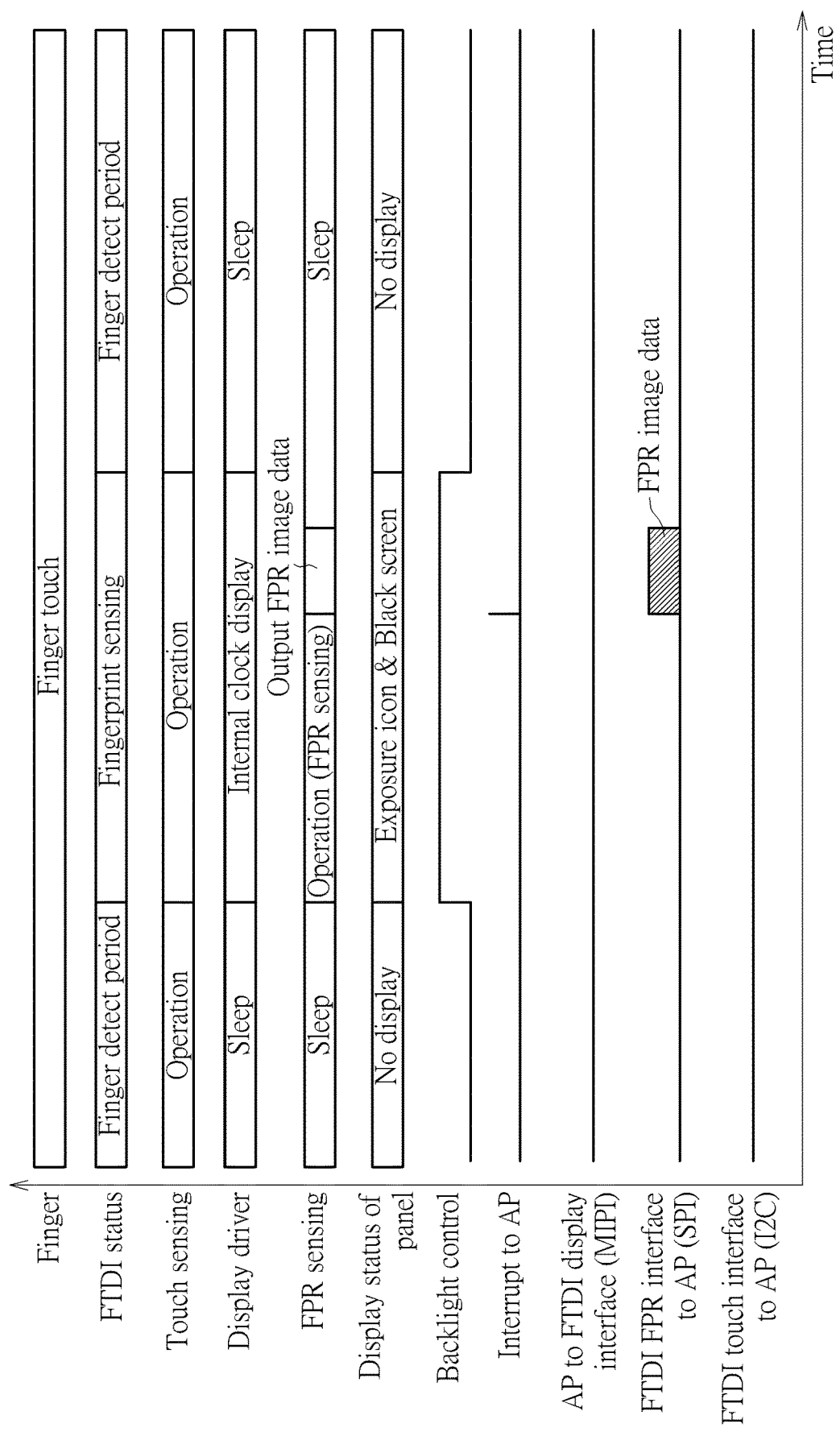

In another embodiment, the fingerprint recognition may not be performed successfully and/or the fingerprint matching may indicate a wrong matching result. In such a situation, the system processor 300 may notify the FTDI circuit 302 that the fingerprint matching is failed, or the FTDI circuit 302 may wait for a period of time but no confirmation message from the system processor 300 is received; hence, the FTDI circuit 302 may control the display panel 304 to enter the off-screen mode, and the backlight emission may be disabled, as shown in FIG. 8. At this moment, each circuit and module of the FTDI circuit 302 may return to original statuses; that is, the display driver circuit 312 and the fingerprint sensing circuit 316 return to the sleep mode, and the touch sensing circuit 314 restarts to perform the low power wakeup gesture detection with 1D scan, to detect the finger touch.

Figure 9:
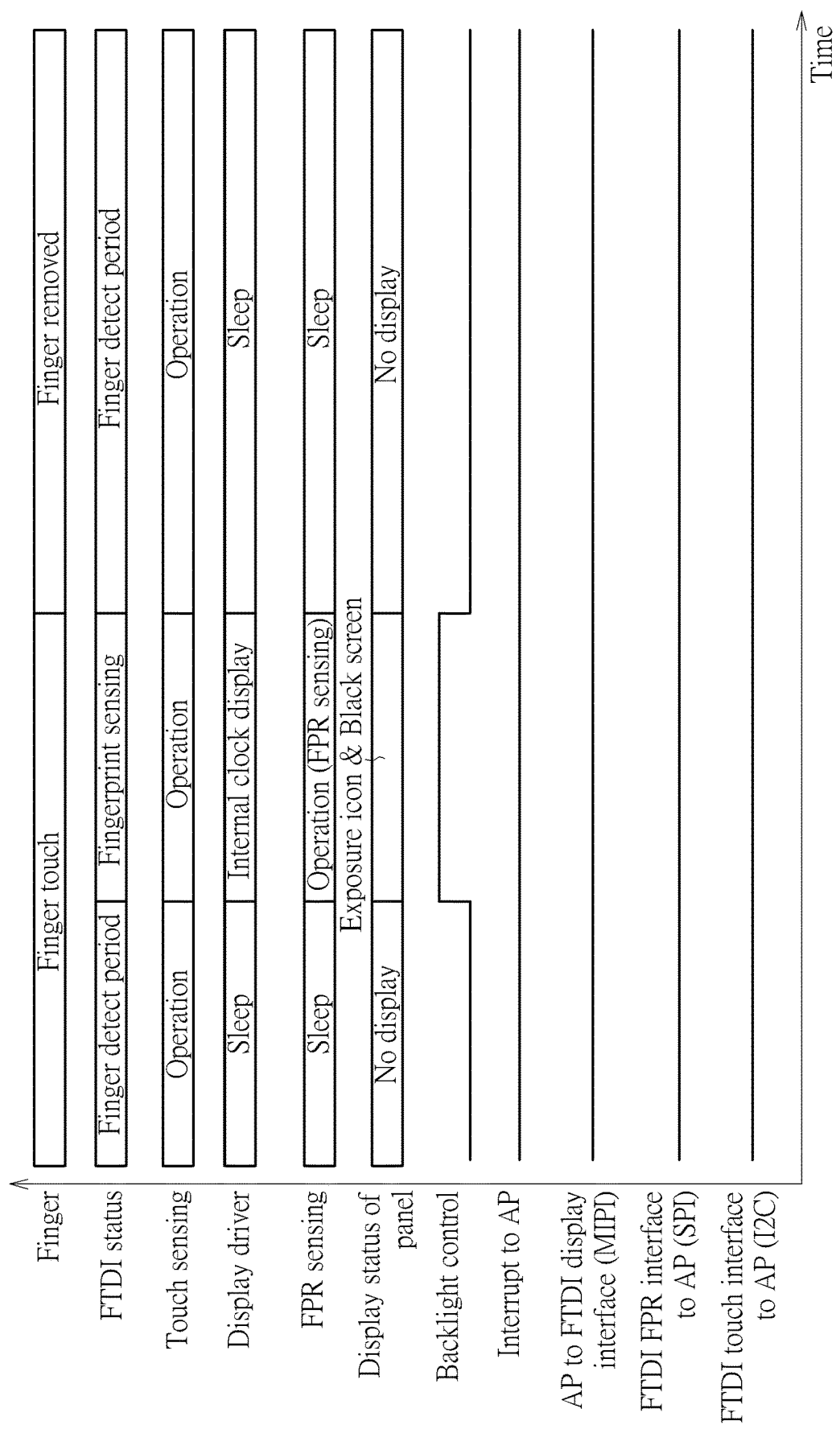

Please note that the touch sensing circuit 314 is still operating to detect the finger touch during the fingerprint recognition process for screen unlocking. In an embodiment, if the touch sensing circuit 314 detects that the touch finger is removed from the display panel 304 during the screen unlocking process, the fingerprint sensing operation may be interrupted, as shown in FIG. 9. At this moment, the fingerprint sensing circuit 316 may stop the fingerprint sensing operation and enter the sleep mode. The display driver circuit 312 may stop displaying the exposure icon and enter the sleep mode, and meanwhile the backlight is disabled and the display panel 304 becomes off-screen. The touch sensing circuit 314 restarts to perform the low power wakeup gesture detection with 1D scan, to detect the finger touch. This touch detection during the screen unlocking process may prevent unnecessary fingerprint sensing operation after the finger is removed.

Please note that the present invention aims at providing a screen unlocking method based on fingerprint recognition fora display panel and an FTDI circuit. Those skilled in the art may make modifications and alternations accordingly. For example, in the embodiments of the present invention, the display driver circuit may control the panel to show an exposure icon at the finger touch position, to generate light emission for optical fingerprint sensing, as shown in FIG. 5. Note that the exposure icon may not be limited to that illustrated in this disclosure. For example, the exposure icon may be of any shape such as a circle or a square, and/or the exposure icon may be shown with any feasible color or combination of several colors, as long as the exposure icon and the corresponding light emission may cover the fingerprint sensing area. Note that the displayed color is associated with the wavelength of emitted light, and the wavelength may influence the sensing result of the fingerprint image.

Further, due to different panel characteristics, the same display data may generate different colors on different panels; hence, it is preferable to apply a flexible exposure icon, where the appearance such as color, size, and/or shape of the exposure icon may be configurable or programmable by a user. In an embodiment, the display panel may also show several customized messages such as time, date, and/or weather when the exposure icon is shown.

In addition, in the above embodiments, the FTDI circuit is configured to control an LCD panel and thus a backlight controller may be applied. In another embodiment, the FTDI circuit may be configured to control an organic light-emitting diode (OLED) panel; hence, the light emission for fingerprint sensing may be controlled by driving OLEDs in the display pixels, and the circuit structure of the FTDI circuit 302 shown in FIG. 3 without the backlight controller may be feasible. Note that the screen unlocking method of the present invention is applicable to any type of display panel, which should not be a limitation on the scope of the present invention. Further, in the embodiments of the present invention, fingerprint sensing may be performed without control and command of the system processor, where the fingerprint sensing scheme may not be limited to optical fingerprint sensing as illustrated in this disclosure. Other type of fingerprint sensing such as ultrasonic fingerprint sensing may also be feasible.

Figure 10A:
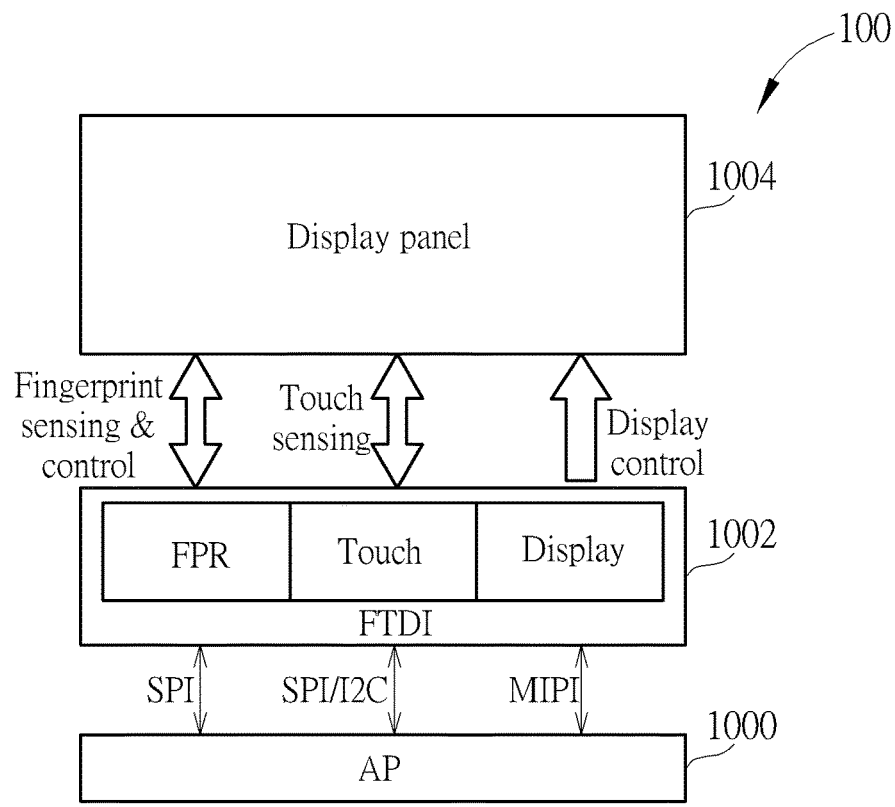
FIG. 10A is a schematic diagram of a fingerprint sensing system according to an embodiment of the present invention.

Please refer to FIG. 10A, which is a schematic diagram of a fingerprint sensing system 100 according to an embodiment of the present invention. As shown in FIG. 10A, the fingerprint sensing system 100 includes a system processor (AP) 1000, an FTDI circuit 1002, and a display panel 1004, where the FTDI circuit 1002 may be a single chip integrated with the processing circuits for display, touch and fingerprint. The related operations and interface controls of the FTDI circuit 1002 are similar to those of the FTDI circuit 302 shown in FIG. 3, and will not be narrated herein.

Figure 10B:
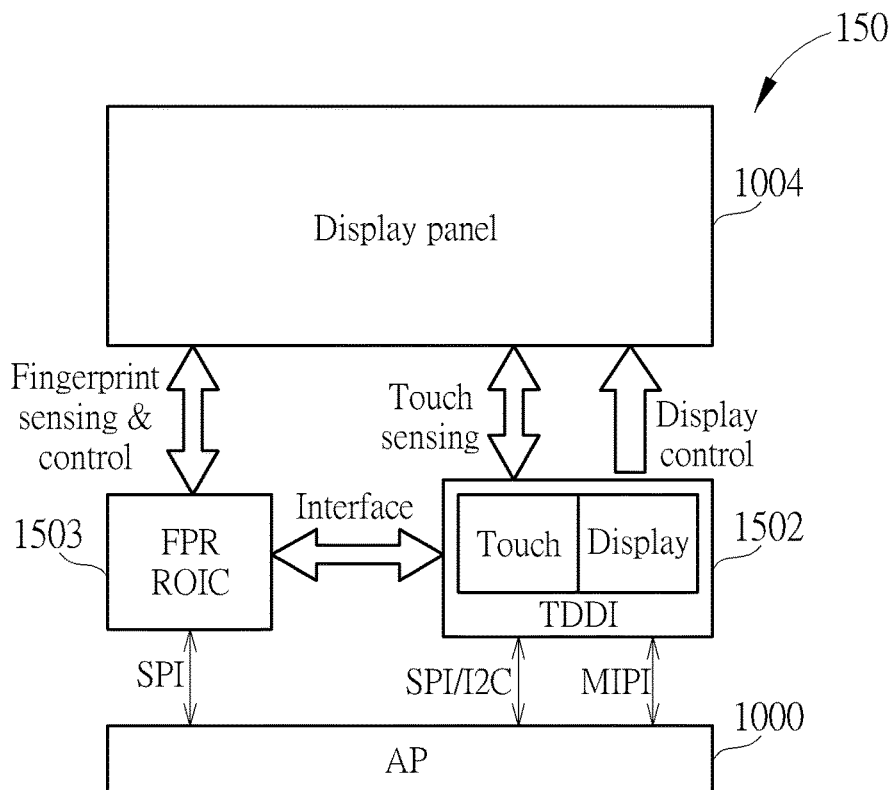
FIG. 10B is a schematic diagram of another fingerprint sensing system according to an embodiment of the present invention.

In another embodiment, the single-chip FTDI circuit may be replaced by a multiple-chip implementation. Please refer to FIG. 10B, which is a schematic diagram of another fingerprint sensing system 150 according to an embodiment of the present invention. As shown in FIG. 10B, the fingerprint sensing system 150 is different from the fingerprint sensing system 100 in that, the fingerprint sensing system 150 includes a touch and display driving integration (TDDI) circuit 1502 and a fingerprint readout integrated circuit (FPR ROIC) 1503, which replace the functions of the FTDI circuit 1002 in the fingerprint sensing system 100. An interface is disposed between the TDDI circuit 1502 and the FPR ROIC 1503, for forwarding necessary messages such as the synchronization signal for synchronizing the display driving, touch sensing and fingerprint sensing functions and the information related to finger touch position and related fingerprint sensing zone(s).

To sum up, the present invention provides a control circuit for controlling the display panel to unlock the screen based on fingerprint recognition. The control circuit may be an FTDI circuit implemented as a single chip, or a two-chip structure with combination of a TDDI circuit and a fingerprint ROIC. In order to save power consumption, the fingerprint sensing circuit and the display driver circuit may be in the sleep mode when the screen is off, and only the touch sensing circuit is operating to detect a finger touch. The fingerprint sensing circuit and the display driver circuit are woken up only when the finger touch is detected. Therefore, the display driver circuit may control the panel to emit light and show an exposure icon correspondingly by using an internal clock display scheme without control of the system processor, and the fingerprint sensing circuit may perform fingerprint sensing on the touch zone (s). The FTDI circuit may notify the system processor after the fingerprint sensing is complete, allowing the system processor to perform fingerprint recognition and matching. The screen is unlocked if the fingerprint matching is successful. The screen unlocking method of the present invention can increase the speed of fingerprint recognition, so as to achieve better user experience of screen unlocking.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control circuit, configured to control a display panel, the control circuit comprising:
   a display driver circuit;
   a fingerprint sensing circuit for performing a fingerprint sensing on a fingerprint sensor having a plurality of zones; and
   a touch sensing circuit for performing a touch sensing, coupled to the display driver circuit and the fingerprint sensing circuit, configured to detect a finger touch on the display panel, determine a touch position of the display panel on which the finger touch is detected, and send information associated with the touch position to the fingerprint sensing circuit;
   wherein the touch sensing is performed before the fingerprint sensing, and the fingerprint sensing circuit is configured to select at least one zone from the plurality of zones to perform fingerprint sensing according to the information associated with the touch position and receive fingerprint image signals from the at least one zone correspondingly;
   wherein the display driver circuit is configured to control the display panel to show an icon, wherein the icon indicates the touch position on which the finger touch is detected; and
   wherein the display driver circuit is further configured to control the display panel to show a black image on areas of the display panel except for the touch position on which the finger touch is detected.

2. The control circuit of claim 1, wherein the icon is shown based on an internal clock of the control circuit.

3. The control circuit of claim 1, wherein the fingerprint sensing circuit is further configured to output image data corresponding to the received fingerprint image signals to a system processor, allowing the system processor to determine whether to unlock the display panel according to the image data.

4. The control circuit of claim 1, wherein the display driver circuit and the fingerprint sensing circuit are woken up from a sleep mode when the finger touch is detected.

5. The control circuit of claim 1, wherein the control circuit is configured to output an interrupt signal to a system processor when the fingerprint image signals are received.

6. The control circuit of claim 1, wherein the fingerprint sensing performed by the fingerprint sensing circuit is interrupted when the touch sensing circuit detects that the finger touch is removed from the display panel.

7. A method of a control circuit, for controlling a display panel, the method comprising:
   performing, by a fingerprint sensing circuit of the control circuit, a fingerprint sensing on a fingerprint sensor having a plurality of zones;
   performing, by a touch sensing circuit of the control circuit, a touch sensing to detect a finger touch on the display panel;
   determining a touch position of the display panel on which the finger touch is detected;
   sending, by the touch sensing circuit, information associated with the touch position of the display panel on which the finger touch is detected to the fingerprint sensing circuit;
   after the touch sensing is performed, selecting, by the fingerprint sensing circuit, at least one zone from the plurality of zones to perform fingerprint sensing according to the information associated with the touch position and receiving fingerprint image signals from the at least one zone correspondingly;
   controlling the display panel to show an icon, wherein the icon indicates the touch position on which the finger touch is detected; and
   controlling the display panel to show a black image on areas of the display panel except for the touch position on which the finger touch is detected.

8. The method of claim 7, wherein the icon is shown based on an internal clock of the control circuit.

9. The method of claim 7, further comprising:
   outputting image data corresponding to the received fingerprint image signals to a system processor, allowing the system processor to determine whether to unlock the display panel according to the image data.

10. The method of claim 7, further comprising:
   waking up a display driver circuit and the fingerprint sensing circuit of the control circuit from a sleep mode when the finger touch is detected.

11. The method of claim 7, further comprising:
   outputting an interrupt signal to a system processor when the fingerprint image signals are received.

12. The method of claim 7, further comprising:
   interrupting the fingerprint sensing when detecting that the finger touch is removed from the display panel.

* * * * *